United States Patent [19]

Nakayama et al.

[11] 4,078,596

[45] Mar. 14, 1978

[54] HIGHLY DURABLE TREAD PATTERN OF A RIB TYPE PNEUMATIC TIRE

[75] Inventors: Osamu Nakayama, Mitaka; Hiroshi Kojima, Hino, both of Japan

[73] Assignee: Bridgestone Tire Company Limited, Tokyo, Japan

[21] Appl. No.: 729,458

[22] Filed: Oct. 4, 1976

[30] Foreign Application Priority Data

Oct. 4, 1975   Japan .................. 50-120140

[51] Int. Cl.$^2$ ...................... B60C 11/06; B60C 11/12
[52] U.S. Cl. ........................ 152/209 R; 152/DIG. 3
[58] Field of Search .......... 152/209 R, 209 A, 209 B, 152/DIG.3

[56] References Cited

U.S. PATENT DOCUMENTS

| | | | |
|---|---|---|---|
| 3,012,599 | 12/1961 | Benson et al. | 152/209 R |
| 3,115,919 | 12/1963 | Roberts | 152/209 R |
| 3,841,374 | 10/1974 | Boileau | 152/209 R |
| 3,847,698 | 11/1974 | Ravenhall | 152/209 R |
| 3,893,498 | 7/1975 | Wayne | 152/209 R |
| 3,954,130 | 5/1976 | Verdier | 152/209 R |

Primary Examiner—Drayton E. Hoffman
Attorney, Agent, or Firm—Sughrue, Rothwell, Mion, Zinn and Macpeak

[57] ABSTRACT

A highly durable tread pattern of a rib type pneumatic tire using two grooves for heavy vehicles is disclosed. The tread is provided with a pair of zigzag grooves extending circumferentially of the tread and dividing the tread into a center rib and a pair of side ribs. The center rib is provided with a plurality of sipe grooves arranged in a row and substantially equally spaced on the circumference of the tread by a pitch corresponding to a pitch between the zigzag tread grooves. The center rib and the pair of side ribs do not interrupt their circumferential continuity. Each of the sipe grooves is composed of a circumferentially extending section inclined at an acute angle of smaller than 45° with respect to the circumferential direction and a widthwisely extending section inclined at an angle of at least 45° with respect to the circumferential direction. These sections are formed into hook-shaped, bracket-shaped or curve-shaped formation or a combination of these formations.

10 Claims, 6 Drawing Figures

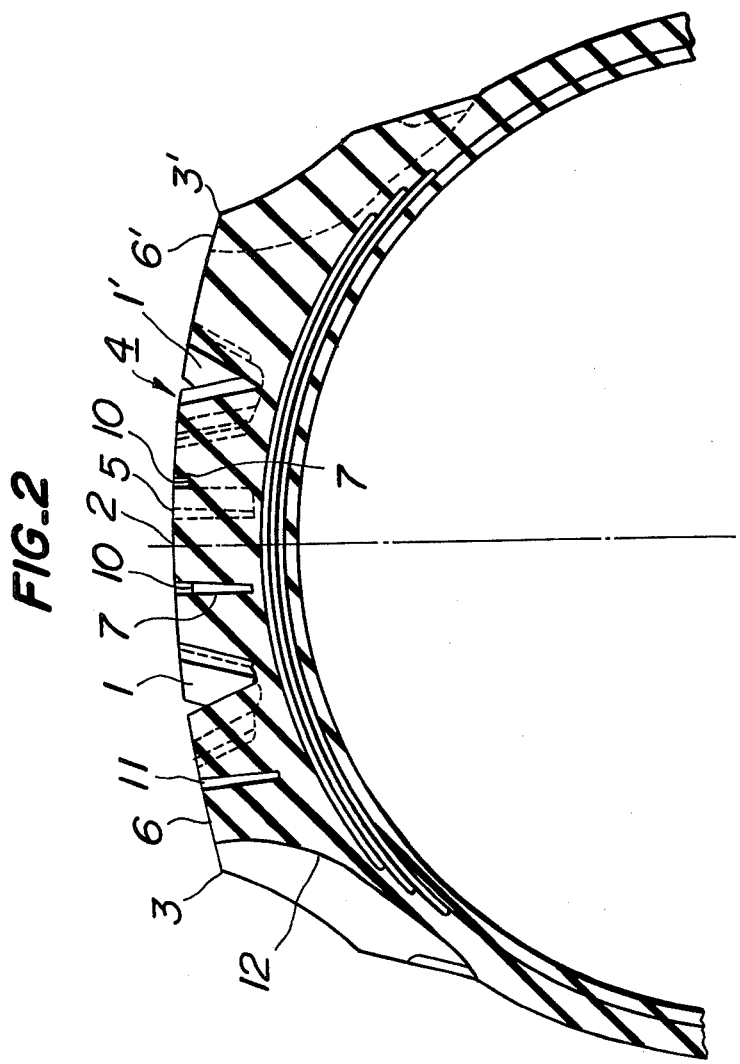

HIGHLY DURABLE TREAD PATTERN OF A RIB TYPE PNEUMATIC TIRE

This invention relates to a highly durable tread pattern of a rib type pneumatic tire using two grooves for heavy vehicles.

In general, a rib type pneumatic tire has widely been used as a pneumatic tire for heavy vehicles which is suited for continuous travel at a high speed. In order to improve the wear resistant property of such type of tire, investigations have heretofore been made to increase the tread width and the radius of curvature of the crown or decrease the number of the tread grooves and the width of these grooves.

The increase of the tread width and the radius of curvature of the crown results in an increase of the volume of tread rubber that tends to excessively increase heat accumulation. On the other hand, the decrease of the number of the tread grooves and the width thereof results in a deterioration of the road-holding or antislip ability of the tire required for travel on wet ground.

Attempts have been made to provide narrow grooves in the rib and connect these narrow grooves to the tread grooves so as to maintain the antislip property irrespective of the decrease of the number of the tread grooves. However, the rigidity of the joints between the narrow grooves and the tread grooves becomes small and tends to wear more readily at the toe of the narrow groove than in the heel thus producing so-called heel and toe uneven wear.

In addition, there occurs an objectionable impression of noise emanating from the tire and also penetration and retention of foreign objects, such as rocks, sticks and the like when the tire is in use.

An object of the invention, therefore, is to provide a highly durable tread pattern of a pneumatic tire using two grooves for heavy vehicles, which can effectively prevent the antislip property and road-adherence on wet ground from being degraded without involving any uneven wear as well as any objectionable impression of noise emanating from the tire and penetration and retention of foreign objects, and which can improve wear and rib-tear resistant properties of the tire.

A feature of the invention is the provision of a highly durable tread pattern of a pneumatic tire using two grooves for heavy vehicles having a tread, the tread having a pair of grooves extending circumferentially of the tread, said grooves being substantially equally spaced on opposite sides of a tread center of the tire about one-fourth of the width of the tread and each the grooves having a depth corresponding to 60%-90% of the tread rubber thickness and a width at the surface of the tread which is sufficient to drain any water which is squeezed off the roads at its contact region with ground under normal running conditions, each the grooves being of zigzag formation and opened at the tread surface, the grooves dividing the tread into three circumferential ribs consisting of a center rib and a pair of side ribs, the center rib being provided with a plurality of sipe grooves substantially equally spaced on the circumference of the tread and interrupting their circumferential continuity, a pitch between two adjacent sipe grooves corresponding to the pitch of the zigzag tread grooves, the sipe grooves being arranged in row on the circumference of the tread and connected at one end thereof to the tread grooves, each the sipe grooves being composed of a circumferentially extending section inclined at an angle of smaller than 45° with respect to the circumferential direction and a widthwisely extending section inclined at an angle of at least 45° with respect to the circumferential direction, each the sipe grooves having a pattern formed of said two sections joined with each other into hook-shaped, bracket-shaped or curve-shape formation or a combination of these formations, each the sipe grooves having a width at the tread surface which will be substantially closed at its contact region with the ground under normal running conditions and a depth which is shallower at the joint between the sections and at that portion of said sections at which the radius of curvature is suddenly changed than the depth of the remaining portions of said sipe grooves, the depth of said remaining portions for a total length of each the sipe grooves corresponding to 25%-50% of the width of the center rib being substantially the same as the depth of said tread grooves, each the side ribs being provided with a notch extending from the tread surface toward a buttress formed of a side rubber of the tire, said notch having a length at the tread surface of 4%-15% of the width of the tread, a width at the tread surface of 5%-25% of the width of the tread and a depth deeper than the depth of the tread groove, the notch being inclined at an angle of 70°-110° with respect to the tread surface at a region extending from the tread surface to that portion of the notch which has a depth which is the same as that of the tread groove, a pitch between two adjacent notches corresponding to the pitch of the zigzag tread grooves.

The invention will now be described in greater detail with reference to the accompanying drawings, wherein:

FIG. 2 is a view in section through a tire tread taken on line A—A of FIG. 1.

Figure 1:
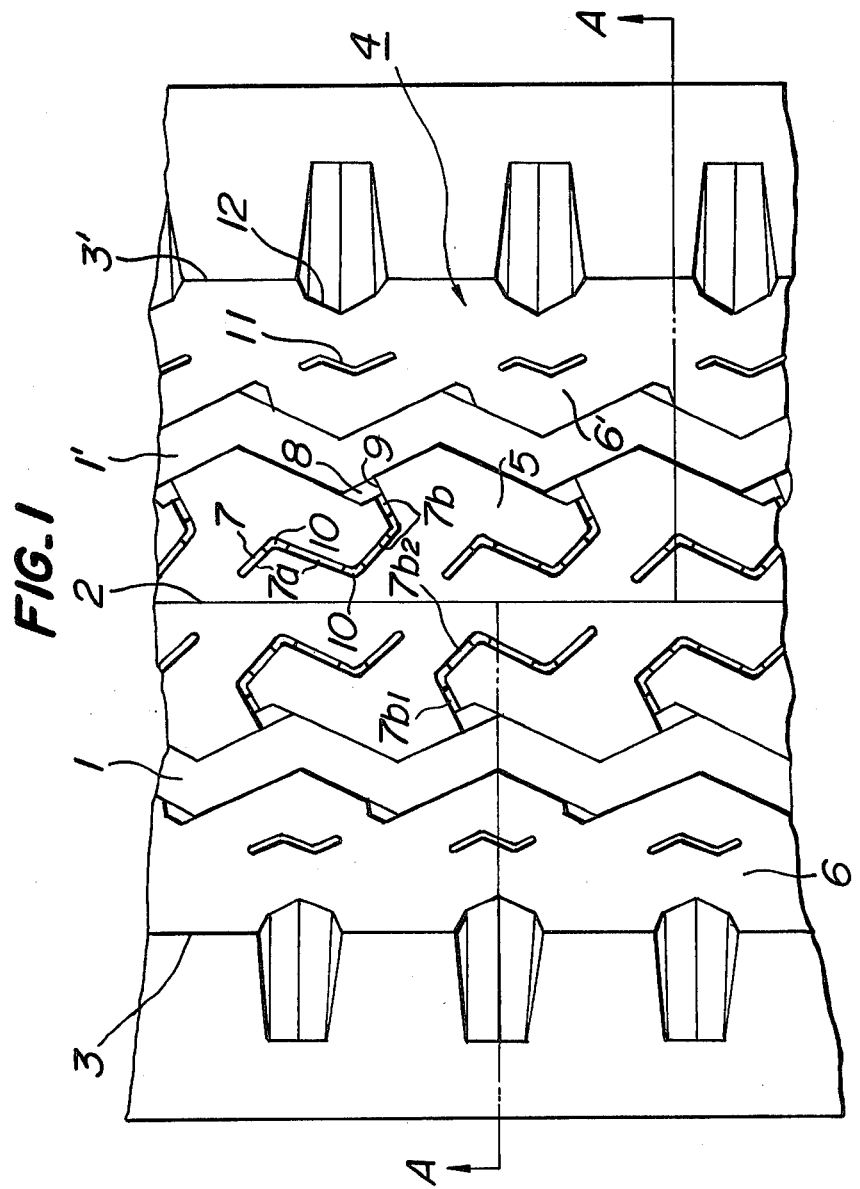
FIG. 1 is a plan view of a portion of a tire tread embodying the present invention.

Referring to FIG. 1 of the drawings, the tire tread 4 is provided with a pair of zigzag tread grooves 1 and 1' extending circumferentially of the tread 4. These grooves 1 and 1' are spaced apart from a tread center 2 about one-fourth the width of the tread 4, thereby providing a relatively wide center rib 5 and a pair of relatively narrow side ribs 6 and 6'.

If the distance between the tread grooves 1 and 1' is narrower than about one-fourth the width of the tread 4, the rigidity of the center rib 5 becomes so small that it is difficult to sufficiently improve the wear resistant property of the tire. On the contrary, if the distance between the tread grooves 1 and 1' is wider than about one-fourth the width of the tread 4, the rigidity of the side ribs 6 and 6' becomes also so small that it is difficult to sufficiently improve the wear resistant property of the tire.

The width of the center rib 5 is selected to a range of 40%-60% of the tread width. As a result, the width of each the side ribs 6, 6' is an average width given by one-half the remainder obtained by subtracting the width of the tread grooves 1, 1' and the width of the center rib 5 from the tread width, the width of the tread grooves 1, 1' being defined by a width at the surface of the tread 4 which is sufficient to drain any water which is squeezed off the roads in contact with the tread 4 under normal running conditions.

The depth of each the tread grooves 1, 1' is required to be selected from a range of 60%-90% of the tread rubber thickness in dependence with the skid base thickness of the tread rubber located between the tread 4 and a carcass such that the required properties of the tire are satisfied.

The center rib 5 is required to be substantially continuous in the circumferential direction of the tire. However, in order to improve the antislip property of the tire as well as prevent uneven wear, in accordance with the invention provision is made of a plurality of sipe grooves 7 substantially uniformly distributed in the circumferential direction on the center rib 5 and substantially equally spaced in the circumferential direction and interrupting their circumferential continuity. Each of the sipe grooves 7 is of wavy or zigzag formation and connected at one end thereof to the tread groove 1, 1'.

Each of the sipe grooves 7 is composed of a circumferentially extending section 7a inclined at an acute angle of smaller than 45° with respect to the circumferential direction and a widthwisely extending section 7b inclined at a larger angle of at least 45° with respect to the circumferential direction. These sections 7a, 7b are connected so as to provide a pattern of hook-shaped, bracket-shaped or curve-shaped formation or a combination of these formations. The sipe grooves 7 are arranged such that a pitch between two adjacent sipe grooves 7 corresponds to the pitch of the zigzag tread grooves 1, 1'.

All of the sipe grooves 7 are substantially equally spaced on the circumference of the center rib 5 and interrupt their circumferential continuity. Each of the sipe groves 7 may be made of the same or a combination of the disclosed configurations.

Between the sipe grooves 7 may be arranged another sipe grooves (not shown) not connected to the tread groove 1, 1' for the purpose of improving uniform distribution of the sipe grooves.

The circumferentially extending section 7a mainly serves to improve the antislip property in the axial direction of the tire of the center rib 5, while the widthwisely extending section 7b exclusively serves to improve the antislip property in the circumferential direction of the tire of the center rib 5. In addition, each of the sipe grooves 7 has a width at the tread surface which will be substantially closed at its contact region with ground under normal running conditions, and as a result, it is possible to prevent uneven heel and toe wear.

So, it is preferable to make the total length of each the sections 7a, 7b substantially equal with each other.

The depth of the sipe groove 7 is made substantially equal to the depth of the tread groove 1, 1'. But, that portion of each the sections 7a, 7b which rapidly changes its radius of curvature or the joint between these sections 7a, 7b may be projected upwardly to form a platform 10 so as to make the depth of the platform 10 shallower than the remaining portions of the sipe groove 7. The total length of the deepest depth of these portions of the sipe groove 7 which are located outside the platform 10 is approximately of 25% to 50% of the width of the center rib 5.

If the total length of the deepest depth of the above mentioned portions of the sipe groove 7 is shorter than 25% of the width of the center rib 5, the center rib 5 could not improve the desired properties of the tire. On the contrary, if the total length of the deepest depth of the above mentioned portions of the sipe groove 7 is larger than 50% of the width of the center rib 5, the rigidity of the center rib 5 becomes insufficient.

The platform 10 is provided at that region of the sipe groove 7 at which the radius of curvature thereof is suddenly changed for the purpose of preventing stress from becoming concentrated onto the above mentioned region in contact with ground and of making the average rigidity of the rib sufficiently large.

In this way, the above mentioned sipe groove 7 can provide desired properties of the tire at the deepest portion thereof even after the tread 4 of the tire becomes worn and reaches to its normal wear condition, that is, even at the end of the life of the tire where the remaining depth of the tread groove 1, 1' becomes smaller than 1.6 mm, thereby maintaining the road-adherence on wet ground and antislip properties of the tire.

In addition, in accordance with the invention, each the side ribs 6, 6' is provided in its lateral edge with a notch 12. The notches 12 are extended from the tread surface to a buttress and spaced apart from each other by a pitch which corresponds to the pitch of the zigzag tread groove 1, 1'. Each the notches 12 is opened at a shoulder portion 3, 3' of the tire and has a length at the tread surface of 4%–15% of the width of the tread 4 and a width at the tread surface of 5% –25% of the width of the tread 4.

The notch 12 is inclined at an angle of 70°–110° with respect to the tread surface at a region extending from the tread surface to that portion of the notch which has a depth which is the same as that of the tread groove 1, 1' thus gradually decreasing the depth thereof toward the buttress and effectively draining any water which is squeezed off the roads in contact with the tread under normal running conditions.

If the inclined angle of the notch 12 with respect to the tread surface is smaller than 70°, there is a risk of the rigidity of the side rib 6, 6' being insufficient. On the contrary, if the inclined angle of the notch 12 with respect to the tread surface is larger than 110°, the water draining action of the tire toward the side portion thereof becomes insufficient after the tire has been worn.

The side rib 6, 6' may also be provided with sipe grooves depending on the design of the tire. In this case, it is necessary to provide the least possible number of the sipe grooves for the purpose of maintaining the rigidity of the side rib 6, 6' and preventing uneven wear such as wear at the shoulder portion. In addition, the sipe grooves provided on the side rib 6, 6' are required to be not connected to the tread grooves 1, 1' in order to prevent the side rib 6, 6' from becoming torn.

A rib type pneumatic tire using two grooves according to the invention shown in FIG. 1 is of size 10.00–2014PR whose crown width is 196 mm.

Tread grooves 1, 1' are spaced apart from a tread center 2 and shoulders 3, 3' of the tire by 49 mm in average, respectively.

Each of the tread grooves 1, 1' is inclined at about 25° with respect to the circumferential direction of the tire and is circumferentially extended in zigzag form with a pitch of about 29 mm. The average depth of each the tread grooves 1, 1' is about 17 mm which corresponds to about 80% of the tread rubber thickness. The width of each the tread grooves 1, 1' measured in a direction perpendicular to the groove wall is about 15 mm so as to sufficiently drain any water which is squeezed off the roads in contact with the tread under the normal running conditions.

As a result, the tread 4 is divided by the tread grooves 1, 1' into three ribs consisting of a center rib 5 and a pair of side ribs 6, 6'.

On the center rib 5 are circumferentially arranged a plurality of sipe grooves 7 substantially equally spaced apart from each other a pitch of which corresponds to the zigzag pitch of the tread groove 1, 1'. The width at the tread surface of the sipe groove 7 is about 2.5 mm which will be substantially closed at its contact region with ground under normal running conditions. The sipe grooves 7 are arranged in row on the circumference of the tread 4 and connected at one end thereof to the tread grooves 1, 1'.

In the embodiment shown in FIG. 1, each of the tread grooves 1, 1' is provided at that portion thereof which is connected to the end of the sipe groove 7 with a notch 9 provided with a platform 8. But, such notch 9 is not always necessary.

The sipe groove 7 is composed of a circumferentially extending section 7a inclined at an acute angle of smaller than 45° with respect to the circumferential direction of the tire and a widthwisely extending section 7b inclined at an angle of at least 45° with respect to the circumferential direction of the tire. These sections 7a, 7b are connected with each other so as to form a hook-shaped groove. It is preferable to make the total length of these sections 7a, 7b substantially equal with each other.

The hook-shaped sipe groove 7 shown in the drawings is provided at that portions of the sections 7a, 7b at which the radius of curvature of these sections is suddenly changed and at a junction between these sections 7a, 7b with a platform 10 whose height from the base of the sipe groove 7 is about 13 mm. The total length of these platforms 10 in each sipe groove 7 is 10-20 mm. The depth of the sipe groove 7 is substantially equal to the depth of the tread grooves 1, 1' and the height of the platform 10 is about 75% of the depth of the sipe groove 7.

If the pattern of the sipe groove 7 is of a curve-shaped formation, an angle formed between a tangent line touching with the curve and the equatorial line of the tire can be regarded as the angle formed by the circumferentially extending section 7a of the above mentioned hook-shaped sipe groove 7 and also the angle formed by the widthwisely extending section 7b of the hook-shaped sipe groove 7 and that portion of the curve which has an infinitely large radius of curvature can be regarded as that portion of the hook-shaped sipe groove 7 which has substantially no change in the radius of curvatures.

It is preferable that the length of the circumferentially extending section 7a of the sipe groove is made substantially equal to that of the widthwisely extending section 7b of the sipe groove 7 for the purpose of improving the antislip property. However, in order to prevent uneven wear, particularly, heel and toe wear, it is preferable to determine the depth of the sipe groove 7 such that the total length of the widthwisely extending section 7b becomes reduced by half after the intermediate or final wear of the tread.

The depth of that portion $7b_1$ of the widthwisely extending section 7b of the sipe groove 7 which is located near the tread grooves 1, 1' is determined such that such portion $7b_1$ can effectively serve as the sipe groove after the intermediate or final wear of the tread. The depth of that portion $7b_2$ of the widthwisely extending section 7b of the sipe groove 7 which is separated from the tread grooves 1, 1' is determined such that such section $7b_2$ becomes worn off after the intermediate wear of the tread. It is a matter of course that if the antislip property of the tire is particularly required, the depth of the widthwisely extending section 7b is determined such that the total region thereof can effectively serve as the sipe groove.

Any other sipe grooves (not shown) which are not connected to the tread grooves 1, 1' may be added to the center rib 5 so as to more evenly distribute the sipe grooves in the center rib 5.

The side ribs 6, 6' are not provided with the sipe grooves 7. But, if the side ribs 6, 6' are required to be provided with the sipe grooves 7 as shown in the drawings, provision must be made of a plurality of sipe grooves 11 which are not connected to the tread grooves 1, 1' for the purpose of preventing the side ribs 6, 6' from becoming torn.

Each the side ribs 6, 6' is provided at its lateral edge with a notch 12 extending from the tread surface to a buttress formed of a side rubber of the tire so as to compensate a degradation of the water draining property of the tread grooves 1, 1' after the final wear thereof.

The notch 12 has a length at the tread surface of about 12 mm which is about 6% of the width of the tread 4 and a width at the tread surface of about 23 mm which is about 12% of the width of the tread 4. That region of the notch 12 which is extended from the tread surface to that portion of the notch 12 which has a depth which is the same as that of the tread groove 1, 1' is inclined at an angle of 70°–110° with respect to the tread surface. The notches 12 are arranged at those positions which are spaced apart by a pitch which corresponds to the pitch between the zigzag tread grooves 1, 1'.

The notch 12 serves to sufficiently drain any water which is squeezed off the roads toward the side portion of the tire when the tread 4 becomes worn. In addition, the notch 12 can improve the antislip property on the wet road and the heat dissipation effect, thereby minimizing excessive heat accumulation leading to tire failure.

It has been found that the tire having the tread pattern shown in the drawings can increase a limit speed for transverse slip about 5% when the tread becomes worn up to 75% of the depth of the tread groove as compared with the same type tire without any sipe groove. More particularly, feeling tests on the transverse slip have yielded the surprising result that the anti-transverse slip property of the tire has been improved over similar tire without having any sipe groove. In addition, a distance until the vehicle stops when measured by braking the tire running at a speed of 80 Km/h becomes shortened about 4% if compared with similar tire without having any sipe groove. That is, the tire according to the invention is far superior to the conventional tires.

Figure 3A:
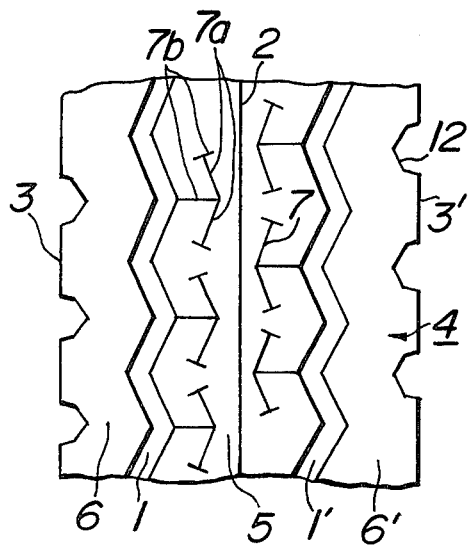
FIGS. 3a, 3b, 3c and 3d are plan views of modified forms of tire tread embodying the present invention.

In FIG. 3a is shown a modified form of the tire according to the invention. In the present embodiment, the sipe groove 7 is composed of two circumferentially extending sections 7a, 7a which are connected at a common joint with each other and a widthwisely extending section 7b which is connected at one end thereof to the common joint and connected at another end to the tread groove 1, 1'.

Figure 3B:
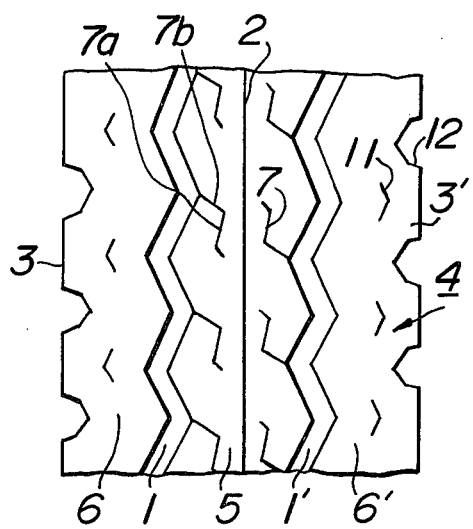

In FIG. 3b is shown another modified form of the tire according to the invention. In the present embodiment, the sipe groove 7 is of hook-shaped formation and composed of a circumferentially extending section 7a and a widthwisely extending section 7b, one end of the section 7b being connected to the tread groove 1, 1'.

Figure 3C:
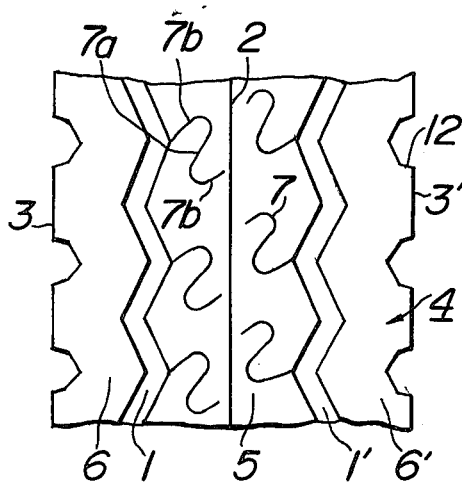

In FIG. 3c is shown a further modified form of the tire according to the invention. In the present embodiment, the sipe groove 7 is of wave-shaped formation and composed of a circumferentially extending rectilinear section 7a and two widthwisely extending rectilinear sections 7b, 7b connected through curved portions to the circumferentially extending rectilinear section 7a.

Figure 3D:
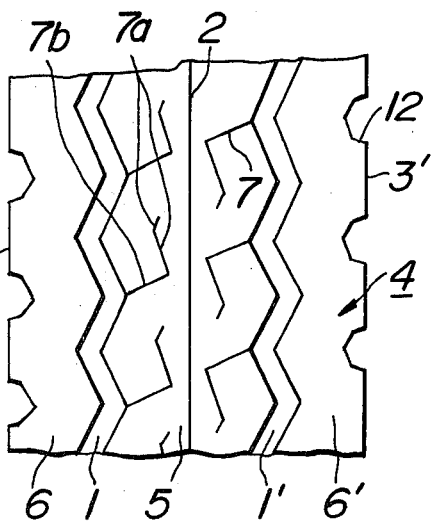

In FIG. 3d is shown a still further modified form of the tire according to the invention. In the present embodiment, the sipe groove 7 is of hook-shaped formation similar to that shown in FIG. 3b, but both the circumferentially and widthwisely extending sections 7a, 7b change their direction of inclination with respect to the circumferential direction of the tire.

As stated hereinbefore, in the case of improving the wear resistant property of the tire by using only two grooves, a difficult problem of degrading the antislip property and road-adherence of the tire on wet ground has been encountered. The invention is capable of eliminating such difficult problem by suitably arranging a plurality of sipe grooves on the circumference of the tread without causing any uneven wear of the tread surface and without producing any objectionable impression of noise emanating from the tire when the tire is in use or without producing any penetration and retention of foreign objects, such as rocks, sticks and the like, thereby improving various properties and durability of the tire.

What is claimed is:

1. A highly durable tread pattern of a rib type pneumatic tire using two grooves for heavy vehicles having a tread, the tread having a pair of grooves extending circumferentially of the tread, said grooves being substantially equally spaced on opposite sides of a tread center of the tire about one-fourth of the width of the tread and each of said grooves having a depth corresponding to 60%-90% of the tread rubber thickness and a width at the surface of the tread which is sufficient to drain any water which is squeezed off the roads at its contact region with ground under normal running conditions, each of said grooves being of zigzag formation and open at the tread surface, said grooves dividing the tread into three circumferential ribs consisting of a center rib and a pair of side ribs, said center rib being provided with a plurality of sipe grooves substantially equally spaced on the circumference of the tread and interrupting their circumferential continuity, the pitch between two adjacent sipe grooves corresponding to the pitch of said zigzag tread grooves, said sipe grooves being arranged in row on the circumference of the tread and connected at one end thereof to said tread groove, each said sipe grooves being composed of a circumferentially extending section inclined at an acute angle of smaller than 45° with respect to the circumferential direction and a widthwisely extending section inclined at an angle of at least 45° with respect to the circumferential direction, each of said sipe grooves having a pattern formed of said two sections joined with each other into hook-shaped, bracket-shaped or curve-shaped formation or a combination of these formations, each of said sipe grooves having a width at the tread surface which will be substantially closed at its contact region with the ground under normal running conditions and a depth which is shallower at said joint between said sections and at that portion of said sections at which the radius of curvature is suddenly changed than the depth of the remaining portion of said sipe groove, said depth of the remaining portion of the sipe groove for a total length of each said sipe grooves corresponding to 25%-50% of the width of said center rib being substantially the same as the depth of said tread groove, each said side ribs being provided with a notch extending from the tread surface toward a buttress formed of a side rubber of the tire, said notch having a length at the tread surface of 4%-15% of the width of said tread, a width at the tread surface of 5%-25% of the width of said tread and a depth deeper than the depth of said tread groove, said notch being inclined at an angle of 70°-110° with respect to said tread surface at a region extending from said tread surface to that portion of said notch which has a depth which is the same as that of said tread groove, a pitch between two adjacent notches corresponding to the pitch of said zigzag tread grooves.

2. A highly durable tread pattern according to claim 1, wherein said center rib does not interrupt its circumferential continuity.

3. A highly durable tread pattern according to claim 1, wherein said pair of side ribs do not interrupt their circumferential continuity.

4. A highly durable tread pattern according to claim 1, wherein the total length of said circumferentially extending section and said widthwisely extending section is made substantially equal with each other.

5. A highly durable tread pattern according to claim 1, wherein that portion of each said sections which rapidly changes its radius of curvature or a joint between said sections is projected upwardly to form a platform.

6. A highly durable tread pattern according to claim 1, wherein the depth of said sipe groove is determined such that the total length of said widthwisely extending section becomes reduced by half after the intermediate or final wear of the tread.

7. A highly durable tread pattern according to claim 1, wherein the depth of that portion of said widthwisely extending section of said sipe groove which is located near said tread grooves is determined such that said portion can effectively serve as said siped groove after the intermediate or final wear of the tread, while the depth of that portion of said widthwisely extending section of said sipe groove which is separated from said tread grooves is determined such that said portion becomes worn off after the intermediate wear of the tread.

8. A highly durable tread pattern according to claim 1, wherein the depth of said widthwisely extending section is determined such that the total length thereof can effectively serve as said sipe groove.

9. A highly durable tread pattern according to claim 1, wherein said center rib is provided with sipe grooves not connected to said tread grooves, said sipe grooves being connected to said tread grooves after the intermediate or final wear of the tire.

10. A highly durable tread pattern according to claim 1, wherein said sipe groove is composed of two circumferentially extending sections which are connected at a common joint with each other and widthwisely extending section which is connected at one end thereof to said common joint and connected at another end to said tread groove.

* * * * *